US009700799B2

(12) United States Patent
Millegan et al.

(10) Patent No.: US 9,700,799 B2
(45) Date of Patent: Jul. 11, 2017

(54) AUTHENTICATING USERS ACROSS APPLICATIONS AND DEVICES USING BIOMETRIC AUTHENTICATION OR WEARABLE DEVICES (71) Applicant: Disney Enterprises, Inc., Burbank, CA (US)

(72) Inventors: Patrick Millegan, Palo Alto, CA (US); Alif Khalfan, Redwood City, CA (US); Robert H. Nelson, Salt Lake City, UT (US)

(73) Assignee: Disney Enterprises, Inc., Burbank, CA (US)

( * ) Notice: Subject to any disclaimer, the term of this patent is extended or adjusted under 35 U.S.C. 154(b) by 282 days.

(21) Appl. No.: 14/566,147

(22) Filed: Dec. 10, 2014

(65) Prior Publication Data
US 2016/0166936 A1 Jun. 16, 2016

(51) Int. Cl.
*A63F 9/24* (2006.01)
*A63F 13/73* (2014.01)
*A63F 13/79* (2014.01)
*A63F 13/98* (2014.01)
*G06F 21/32* (2013.01)
*G06F 21/35* (2013.01)
*H04L 29/06* (2006.01)
*H04W 12/06* (2009.01)
*H04W 4/00* (2009.01)

(52) U.S. Cl.
CPC .............. *A63F 13/73* (2014.09); *A63F 13/79* (2014.09); *A63F 13/98* (2014.09); *G06F 21/32* (2013.01); *G06F 21/35* (2013.01); *H04L 63/0861* (2013.01); *H04W 4/001* (2013.01); *H04W 12/06* (2013.01)

(58) Field of Classification Search
None
See application file for complete search history.

(56) References Cited

U.S. PATENT DOCUMENTS

2010/0232653 A1* 9/2010 Muquit .................. G06F 21/32
382/116
2011/0201415 A1* 8/2011 Gagner .................. G06Q 50/34
463/25

(Continued)

OTHER PUBLICATIONS

Sean Martin; Network World; "BYOD is a user-driven movement, not a secure mobile device strategy", Network World, Jul. 6, 2012, pp. 1-4,<http://www.networkworld.com/news/2012/070612-byod-260730.html>.

(Continued)

*Primary Examiner* — Paul A D'Agostino
(74) *Attorney, Agent, or Firm* — Patterson + Sheridan, LLP (57) ABSTRACT Systems, methods, and computer program products to perform an operation comprising authenticating a user on a first device by at least one of a biometric identifier of the user and a wearable device of the user, identifying a first application associated with the user, receiving, by the first device, the first application, receiving, by the first device, state information of the first application, wherein the state information reflects a previous interaction of the user with the first application, installing the first application on the first device, and restoring the state information on the first device.

20 Claims, 5 Drawing Sheets (56) References Cited

U.S. PATENT DOCUMENTS

| | | | | |
|---|---|---|---|---|
| 2012/0309351 A1* | 12/2012 | Dutta | ............ | G06Q 10/20 |
| | | | | 455/411 |
| 2013/0006736 A1* | 1/2013 | Bethke | ............ | G06Q 30/02 |
| | | | | 705/14.12 |
| 2014/0089153 A1* | 3/2014 | Pinski | ............ | G06Q 40/02 |
| | | | | 705/35 |
| 2015/0087426 A1* | 3/2015 | Schulz | ............ | G07F 17/3255 |
| | | | | 463/43 |
| 2015/0358790 A1* | 12/2015 | Nasserbakht | ..... | G06F 17/30088 |
| | | | | 455/414.1 |

OTHER PUBLICATIONS

Michael Gorman; "Google patents new facial recognition technology to let users unlock phones with a wink and a smile", Jun. 7, 2013, pp. 1-3, <http://www.engadget.com/2013/06/07/google-face-unlock-facial-gesture-patent/>.

* cited by examiner

AUTHENTICATING USERS ACROSS APPLICATIONS AND DEVICES USING BIOMETRIC AUTHENTICATION OR WEARABLE DEVICES

BACKGROUND

Field of the Invention

Aspects disclosed herein relate to authenticating users of applications. More specifically, aspects disclosed herein relate to authenticating users across applications and devices using biometric authentication or wearable devices.

Description of the Related Art

Presenting users in mobile games with prompts for information, such as a login request, causes an undesirable number of users to exit the game and never return. Game developers spend a significant amount of time and effort planning how to approach the user with these requests in the least intrusive ways. However, each approach has its own weakness, and they are not as seamless as would be desired for users.

SUMMARY

Aspects disclosed herein provide at least a system, method, and computer program product to perform an operation comprising authenticating a user on a first device by at least one of a biometric identifier of the user and a wearable device of the user, identifying a first application associated with the user, receiving, by the first device, the first application, receiving, by the first device, state information of the first application, wherein the state information reflects a previous interaction of the user with the first application, installing the first application on the first device, and restoring the state information on the first device.

BRIEF DESCRIPTION OF THE DRAWINGS

So that the manner in which the above recited aspects are attained and can be understood in detail, a more particular description of aspects of the disclosure, briefly summarized above, may be had by reference to the appended drawings.

It is to be noted, however, that the appended drawings illustrate only typical aspects and are therefore not to be considered limiting in scope, for the disclosure may admit to other equally effective aspects.

DETAILED DESCRIPTION

Aspects disclosed herein leverage wearable devices and/or biometric authentication to provide enhanced experiences when interacting with computer games and other applications. One aspect disclosed herein may validate the identity of a player in a multi-player game using a biometric identifier or wearable device associated with the player. Doing so ensures that the player is being controlled by the person associated with the player, and not a different person. In addition, aspects disclosed may unlock different items that are specific to the person (or any associated groups, such as their gender, age group, preference groups, and the like).

Similarly, if a user has previously played game X on device A, the user's progress and game state data may be saved in a user profile on the device. In addition, the user's progress and game state data could be replicated to a remote server (e.g., running within a cloud computing environment) for use in synchronizing the user's progress and game state data across multiple devices. Additionally, biometric identifiers or identifiers for wearable devices may be associated with the user's account. If the user subsequently installs game X on a new device (or deletes and reinstalls the game on device A), embodiments disclosed herein may allow the user to automatically restore game X to its previous state (including the user's progress data) on device A by presenting the wearable device or biometric identifier as a means of authentication. Upon successfully authenticating the users, embodiments can retrieve the user progress and game state data from the remote server and store the data such that it is accessible by game X. For instance, once game X is reinstalled on device A, the user may resume playing game X on device A, which includes the user's progress information stored in the profile.

Similarly, if the user wishes to access game X on device B, the user may provide the wearable device or biometric identifiers as a means of authentication. Once the user is authenticated, the user's progress data for game X will be synchronized to device B. Additionally, if the user wishes to play game Y on device A, the user may provide the wearable device or biometric identifiers as a means of authentication. The user may then be authenticated in game Y on device A based on the biometric identifiers or wearable devices associated with the user in game X's settings. Upon successfully authenticating the user, embodiments may alter the game play experience for game Y based on the user's data for game X. For example, the user may be presented with different rewards for customer loyalty in game Y, upon authenticating the user and determining that the user has previously played related games on one or more different devices.

Figure 1A:
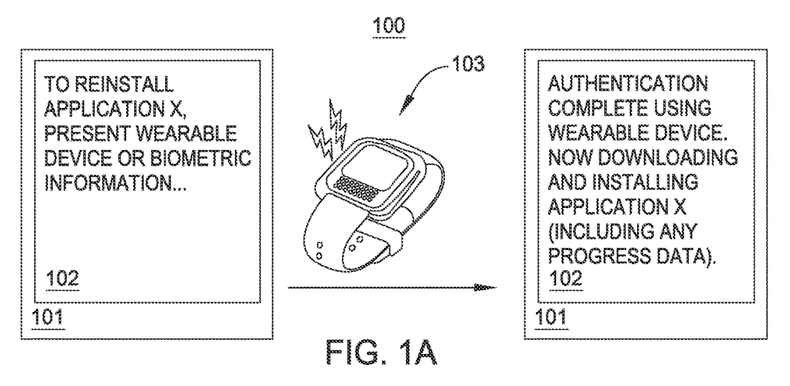
FIGS. 1A-1C are schematics illustrating techniques to authenticate users across applications and devices using biometric identifiers or wearable devices, according to one aspect.

FIG. 1A is a schematic 100 illustrating techniques to authenticate users across applications and devices using biometric identifiers or wearable devices, according to one aspect. As shown, an application 102 executing on a mobile device 101 is requesting authentication credentials from a user. Specifically, the application 102 is requesting that the user present a wearable device or biometric information in order to allow the application 102 to reinstall application X on the mobile device 101. The application 102 may reference a database specifying a list of previously installed applications on the mobile device 101 in order to identify application X as a candidate for reinstallation on the mobile device 101. The application X may be any application, such as a video game. The user may have previously installed application X on the mobile device 101, but application X is no longer present on mobile device 101. During the previous interactions with application X, the user's progress or other state data may be saved to a user profile for the application X. The user profile may also include biometric information or a wearable device associated with the user. The biometric information or wearable device may be used to authenticate the user in application X (or other applications). Generally, the biometric identifier may be any distinctive, measurable characteristic used to label and describe individuals. For example, the biometric identifier may include, without limitation, fingerprints, handprints, deoxyribonucleic acid (DNA), ribonucleic acid (RNA), palm veins, facial features (for facial recognition), hand geometry, iris patterns, retina patterns, and a scent or odor of the user.

As shown, the user has presented a wearable device 103 to the mobile device 101. Specifically, the wearable device 103 is a smart watch. However, the wearable device may be any device which includes an electronic identifier, including without limitation a radio frequency identifier (RFID) module, a Bluetooth module, and a near field communications (NFC) module. Examples of such wearable devices 103 include glasses with an optical head-mounted display, smart watches, pedometers, headphones, personal media players, and the like. When the wearable device 103 communicates with the mobile device 101, the application 102 may receive the identifier from the wearable device 103. The application 102 may then determine whether the identifier from the wearable device 103 is associated with any user accounts (or profiles) in the previously installed applications. In some aspects, the application 102 may reference a remote data store to identify the existence of accounts including the identifier from the wearable device 103 (or the previously installed applications on the mobile device 101).

The application 102 may then determine that the wearable device 103 is registered with the user's profile in application X. In response, the application 102 may then initiate the download and installation of application X (including any user state data) on the mobile device 101. Therefore, as shown in FIG. 1A, the application 102 indicates to the user that the user has been authenticated using the wearable device 103, and that application X is being downloaded and installed on the mobile device 101. Once application X is installed on the device 101, the user may begin interacting with application X, which was updated to include the user's state data. For example, if application X is a video game, and the user previously reached level 8 and had a score of 1,000,000, this level and score would be reflected in the application X on mobile device 101. Furthermore, content purchased by the user in the same or related games may be reflected on mobile device 101.

Figure 1B:
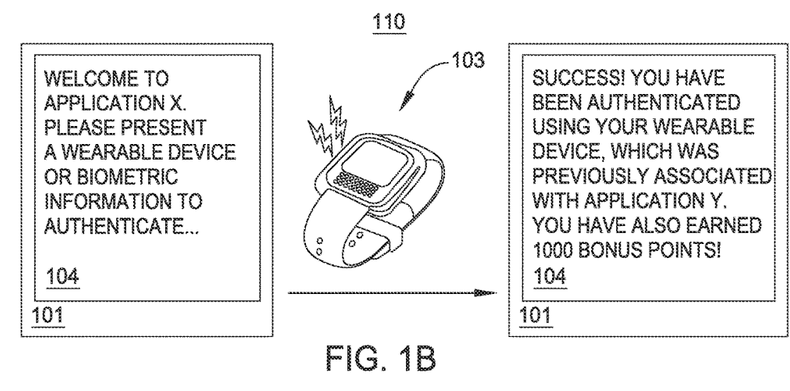

FIG. 1B is a schematic 110 illustrating techniques to authenticate users across applications and devices using biometric identifiers or wearable devices, according to one aspect. Generally, FIG. 1B reflects an aspect where a user is authenticated in a second application using a wearable device 103 (or biometric identifier, not pictured) previously used by the user to access a first application. As shown, an application X executing on mobile device 101 has generated a prompt 104 asking a user to present a wearable device or biometric identifier to authenticate in the user in application X. Again, the user may present the wearable device 103 to the mobile device 101. Once application X receives the unique identifier of the wearable device 103, the application X may use the identifier to determine whether the user is associated with any other applications. The application X may, for example, refer to a remote store of user data which specifies whether the unique identifier is associated with any different applications (or accounts related thereto).

In the example depicted in FIG. 1B, application X has determined that the wearable device 103 was previously associated with application Y. Applications X and Y may be provided by the same entity. As such, the user is seamlessly authenticated with application X, based on the association with application Y. In addition, the application X has awarded the user 1,000 bonus points as a loyalty reward for playing a related game (application Y) provided by the same entity. Generally, the application X may provide any type of loyalty rewards to the user.

Figure 1C:
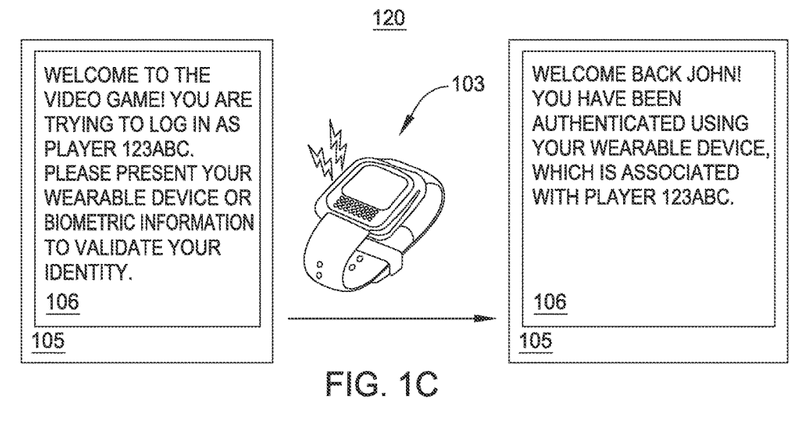

FIG. 1C is a schematic 120 illustrating techniques to authenticate users across applications and devices using biometric identifiers or wearable devices, according to one aspect. Generally, FIG. 1C illustrates an aspect where the identity of a player in a video game is validated using a wearable device. Because anyone can attempt to play as a different person's character in a video game, aspects disclosed herein ensure that the person associated with a character (or account) is indeed the person attempting to play using that character (or account). As shown, a video game 106 is executing on a computing device 105. The computing device 105 may be any device configured to allow users to play the video game 106, such as game consoles, hand held gaming devices, smart phones, laptop computers, desktop computers, tablets, and the like.

As shown, the video game 106 indicates that the user is attempting to log in as player 123ABC, where 123ABC corresponds to a username (or account nickname) used by a person in the video game 106. For example, player 123ABC may be a 20 year old man named John Doe living in the United States. In order to ensure that John Doe, and not his evil twin Jim Doe, is attempting to play the game 106, the game 106 asks for a biometric identifier or wearable device as an authentication token. John Doe may then present the biometric identifier or wearable device (such as the pictured wearable device 103) that is associated with the account 123ABC. As shown, when the wearable device 103 is presented, the video game 106 returns an indication that John Doe has been authenticated using the wearable device 103, which is associated with the player account 123ABC. Once the video game 106 validates John Doe's identity, the video game 106 may unlock special items for John Doe. In at least one aspect, the special items may be targeted to John based on one or more of his attributes (such as age, gender, loyalty to the game, and the like). For example, the video game 106 may unlock a new character targeted to young males who live in the United States, or members who have been playing the video game for more than 30 days. Similarly, the video game may unlock a dance party including players from John Doe's local football team. Generally, the video game 106 may unlock any type of items, awards, levels, or gameplay element when John Doe's identity is validated.

Although FIGS. 1A-1C are depicted using a wearable device 103, a biometric identifier may similarly be used to authenticate the user. For example, in FIG. 1A, the user may provide a thumbprint to authenticate, which would cause the application 102 to reinstall application X on mobile device 101. Similarly, in FIG. 1B, the user may provide a retinal scan responsive to the prompt. The application X may then determine that the retinal scan data is associated with application Y, and authenticate the user in application X. In at least one aspect, successful authentication may make the applications available for download on the mobile device 101 without additional cost, e.g., within an app store application, rather than just always starting the download right away. Additionally, in FIG. 1C, John Doe may present his own fingerprint, which would validate his identity as the true owner of the player account 123ABC. Similarly, if Jim Doe presents his fingerprint, his identity will not be validated, and Jim Doe will not be able to play as player 123ABC, protecting other players of the video game 106.

Figure 2:
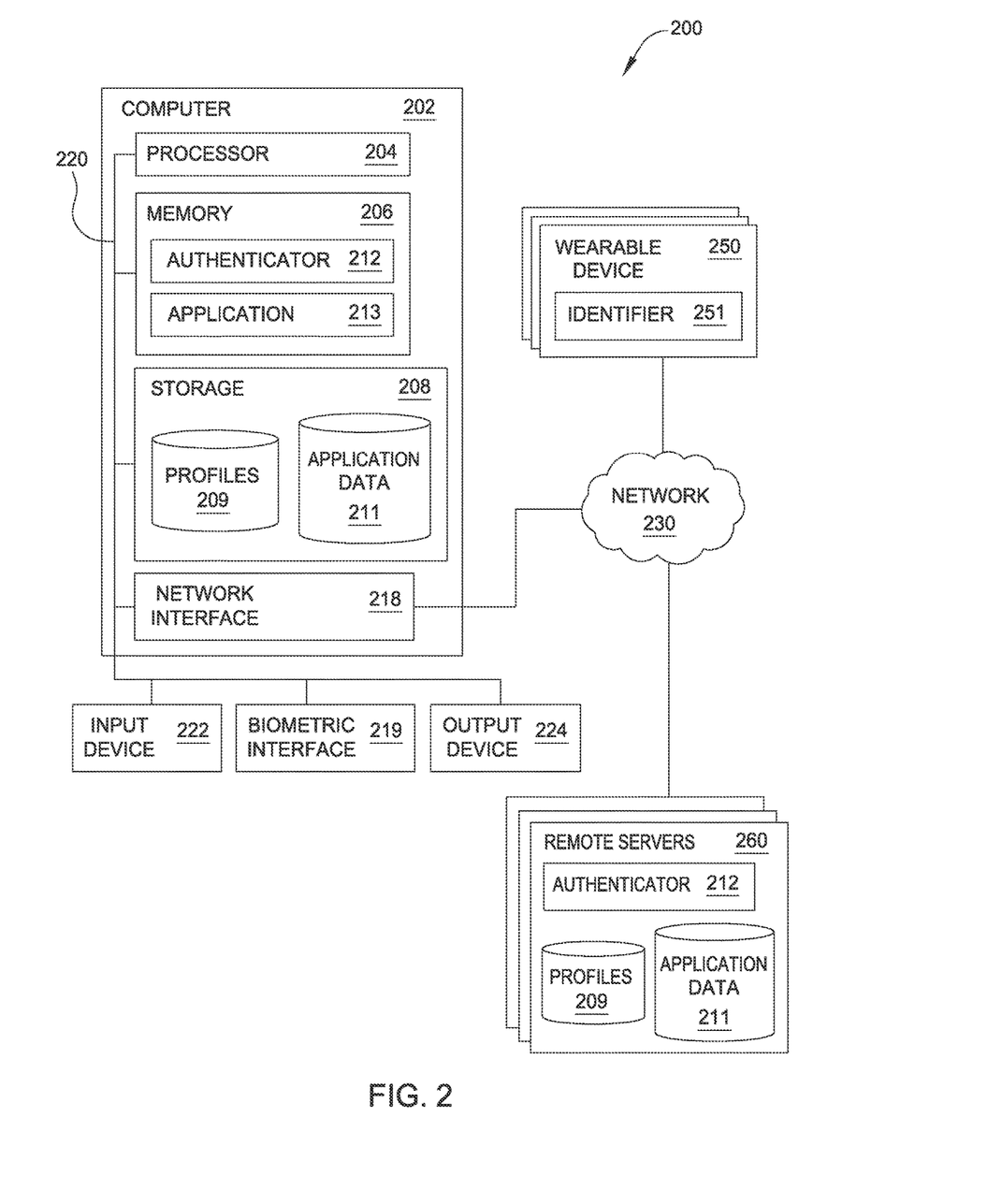
FIG. 2 is a block diagram illustrating a system to authenticate users across applications and devices using biometric identifiers or wearable devices, according to one aspect.

FIG. 2 is a block diagram illustrating a system 200 to authenticate users across applications and devices using biometric identifiers or wearable devices, according to one aspect. The networked system 200 includes a computer 202. The computer 202 may also be connected to other computers via a network 230. In general, the network 230 may be a telecommunications network and/or a wide area network (WAN). In a particular aspect, the network 230 is the Internet. In at least one aspect, the computer 202 is a mobile computing device. Examples of mobile computing devices include, without limitation, smartphones, laptop computers, tablet computers, portable game devices, and the like.

The computer 202 generally includes a processor 204 connected via a bus 220 to a memory 206, a network interface device 218, a storage 208, an input device 222, and an output device 224. The computer 202 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 204 is included to be representative of a single CPU, multiple CPUs, a single CPU having multiple processing cores, and the like. The network interface device 218 may be any type of network communications device allowing the computer 202 to communicate with other computers via the network 230. In at least one aspect, the network interface 218 communicates with wearable devices, such as the wearable device 250, in order to retrieve a unique identifier 251 from the wearable device. As previously indicated, the wearable device 250 may be any wearable device including any type of unique identifier 251. The biometric interface 219 is an element configured to receive biometric information from a user. Examples of the biometric interface 219 include retinal scanners, fingerprint readers, and the like. Generally, the biometric interface 219 may be configured to receive data for any biometric identifier.

The storage 208 may be a persistent storage device. Although the storage 208 is shown as a single unit, the storage 208 may be a combination of fixed and/or removable storage devices, such as fixed disc drives, solid state drives, SAN storage, NAS storage, removable memory cards or optical storage. The memory 206 and the storage 208 may be part of one virtual address space spanning multiple primary and secondary storage devices.

The input device 222 may be any device for providing input to the computer 202. For example, a keyboard and/or a mouse may be used. The output device 224 may be any device for providing output to a user of the computer 202. For example, the output device 224 may be any conventional display screen or set of speakers. Although shown separately from the input device 222, the output device 224 and input device 222 may be combined. For example, a display screen with an integrated touch-screen may be used.

As shown, the memory 206 contains the authenticator 212, which is an application generally configured to authenticate users based on biometric identifiers and/or wearable devices. Generally, the authenticator 212 may include logic to receive and analyze biometric identifier data and/or wearable device identifier data, which may allow a user to be authenticated to an application, such as the application 213. In addition, the authenticator 212 may be configured to perform the functionality described in FIGS. 1A-C. Specifically, the authenticator 212 may validate a person's identity by receiving a biometric identifier of the user or an identifier 251 from a wearable device 250 of the user when an attempt is made to log into an application 113 (which may be any type of application where users interact with other users, such as a video game or other online gaming service). When the person's identity is successfully validated, the authenticator 212 (or the application 213) may unlock special rewards or other items for the person's identity.

Similarly, the authenticator 212 may provide an interface to allow a user to reinstall an application (such as the application 213) on their mobile device by receiving a biometric identifier of the user or an identifier 251 from a wearable device 250 of the user. Once reinstalled, the application 213 may include state data from the application data 211 reflecting the user's previous interactions with the application 213 (on the same or other devices). Similarly, the authenticator 212 may authenticate a user in a second application upon determining that the user's biometric identifier or wearable device 250 identifier 251 was previously associated with a second application. Further still, the authenticator 212 may authenticate the user in an application 213 executing on a second device using the biometric identifier or wearable device identifier 251 that was previously associated with the application 213 on a first device. The application 213 may be any application, such as a video game. In at least one aspect, the functionality of the authenticator 212 is integrated into the application 213. The authenticator 212 may further communicate with remote servers 260 that store profile data 209 and application data 211, in the event that the data required by the authenticator 212 is not present on the computer 202. For example, the application data 211 on the remote servers 260 may include installation packages for a plurality of different applications that may be installed on a mobile device. In at least one aspect, the installation packages may be on a first remote server 260, while the state data for the application may be stored on a second remote server 260, in a user profile in the profiles 209. Such a configuration reflects where a user may install an application from a first source (e.g., the first remote server 260), and the user's state data is stored to a second source (e.g., the second remote server 260).

As shown, the storage 208 contains the profiles 209 and the application data 211. Generally, the profiles 209 include profile data for one or more users of an application 213. The profiles 209 may include, without limitation, contact information for a user, user preferences, state (or progress) data for different applications 213, biometric identifiers of the user, and/or wearable device identifiers 251 associated with the user. In some aspects, the user profiles 209 are anonymous, in that they include no name, address, email, or other identification information outside of the biometric identifiers or wearable device identifiers 251. The authenticator 212 and/or the applications 213 may reference the profiles 209 in order to determine whether a received wearable device identifier 251 or biometric identifier matches a record in the profiles 209. Upon finding such a match, the authenticator 212 may authenticate the user according to one or more of the aspects described above. The application data 211 may include a listing of applications installed on the computer 202. The application data 211 may also reference account data in the profiles 209, which may include a reference to biometric identifiers or wearable device identifiers 251 stored in the profiles 209. If the authenticator 212 determines that a user has installed and used an application on the computer 202, the authenticator 212 (or an associated application, such as the application 102 in FIG. 1A) could restore the application to its previous state upon successfully authenticating the user using the biometric data or wearable device identifier, e.g., by reinstalling the application on the computer 202 and retrieving application state information corresponding to the user from a remote server 260.

Figure 3:
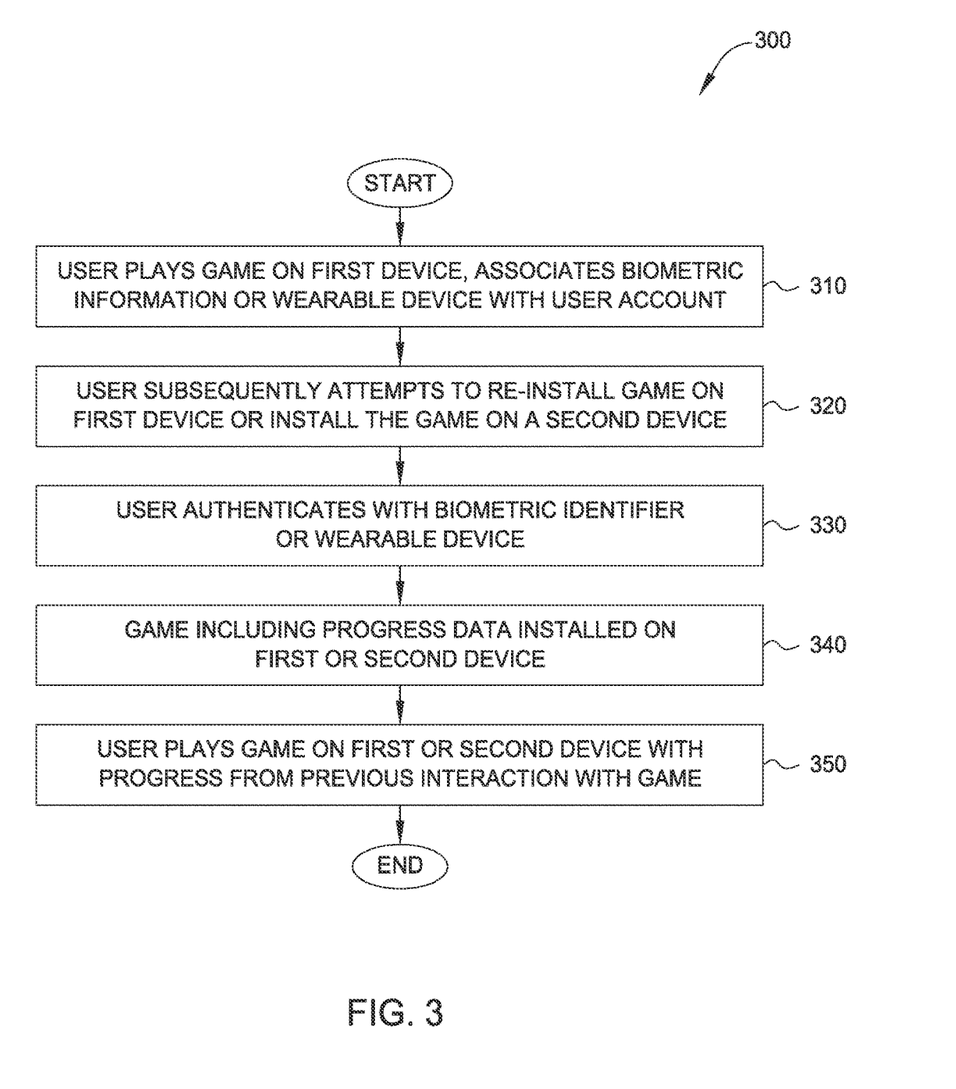
FIG. 3 is a flow chart illustrating a method to restore applications and progress across multiple devices, according to one aspect.

FIG. 3 is a flow chart illustrating a method 300 to restore applications and progress across multiple devices, according to one aspect. Generally, the steps of the method 300 allow users to restore applications (e.g., reinstalling the application on a particular device or installing the application for the first time on a new device) using biometric identifiers or wearable devices. Although the steps of the method 300 are discussed with reference to a game, the functionality of the method 300 is equally applicable to any application type.

The method 300 begins at step 310, where a user plays a game on a first device and associates biometric information and/or a wearable device with the user's account. For example, during a registration process with the game, the user may present a set of headphones, glasses, a watch, or other wearable device that includes a unique identifier. Similarly, the user may present biometric information, such as a fingerprint or iris scan. Once the user presents the information, the information may be stored in a user profile for the user. The user profile may be stored locally and/or remotely. At step 320, the user may subsequently attempt to re-install the game on the first device after having removed the game from the first device. Alternatively, the user may attempt to install the game on a second device.

At step 330, the user may authenticate with the authenticator 212 using the biometric identifier or wearable device presented at step 310. The authenticator 212 may search the profiles 209 and/or application data 211 in order to determine that the biometric identifier and/or wearable device received at step 330 is associated with the game. At step 340, the authenticator 212 (or another application incorporating the functionality of the authenticator 212) may cause the game, including any state or progress data, to be installed on the first or second device, as the case may be. At step 350, the user may play the game on the first or second device while enjoying the benefit of the progress data from the user's previous interactions with the game.

Figure 4:
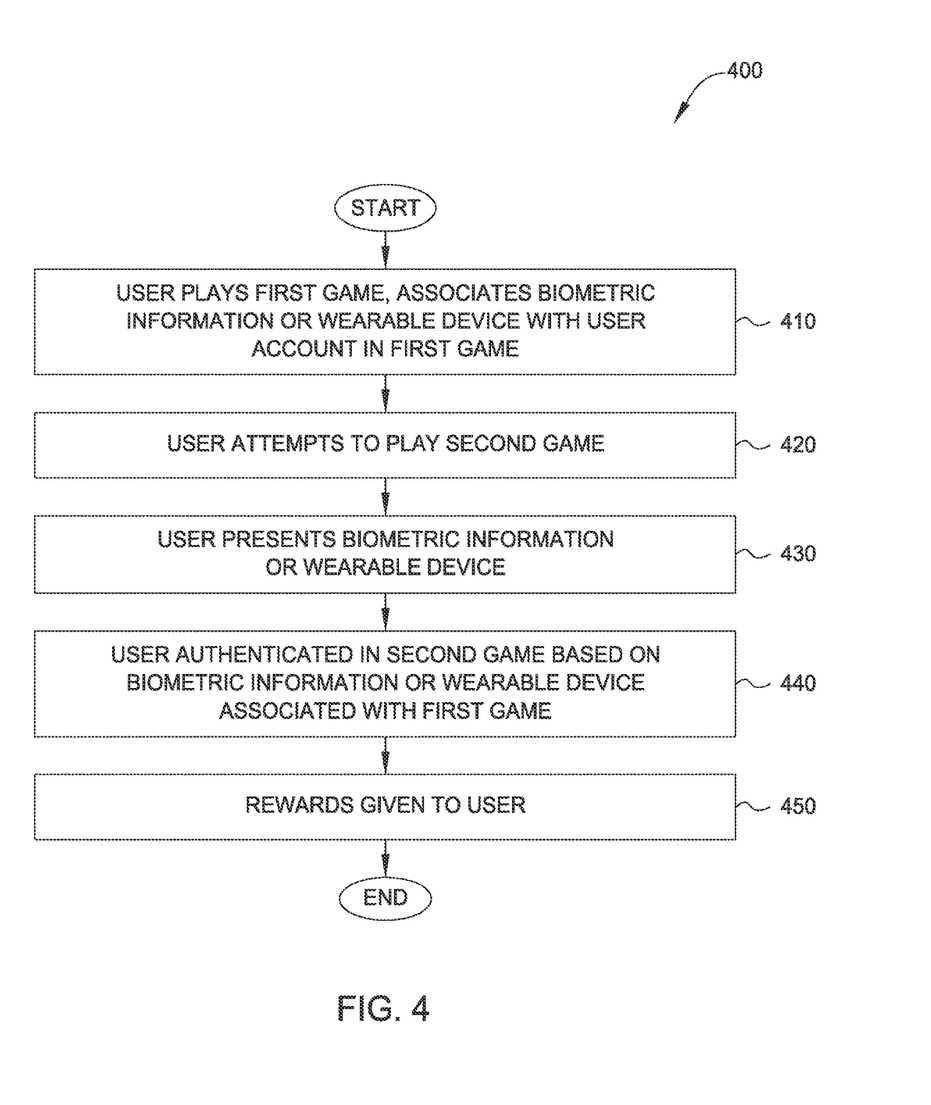
FIG. 4 is a flow chart illustrating a method to identify players across multiple games, according to one aspect.

FIG. 4 is a flow chart illustrating a method 400 to identify players across multiple games, according to one aspect. Generally, the steps of the method 400 authenticate a user in a second game based on a biometric identifier or wearable device previously associated with the user in a first game. Although the steps of the method 400 are discussed with reference to a game, the functionality of the method 400 is equally applicable to any application type.

The method 400 begins at step 410, where a user plays a first game. Additionally, the user may associate biometric information or a wearable device identifier with the first game. For example, during a registration process (or at any other point), the user may associate a unique identifier for a smart watch with the first game. The first game may store the information received from the user in an account (or profile) for the user. Similarly, the first game may store any progress information or state data generated by the user's interaction with the first game in the user profile. At step 420, the user may attempt to play a second game (on the same device or a different device).

At step 430, the user may present biometric information or a wearable device to the second game. The biometric information or the wearable device may be the same as the user presented to the first game at step 410. At step 440, the authenticator 212 may authenticate the user in the second game based on the biometric information or wearable device associated for the first game. For example, if the user provides a fingerprint, the authenticator 212 may match the data points of the fingerprint to fingerprint data stored in the profiles 209. If the authenticator 212 detects a match in the profiles 209 (which may specify the relationship with the first game), the authenticator 212 may authenticate the user in the second game. At step 450, the user may be given loyalty rewards by the second game and/or the authenticator 212. For example, the loyalty rewards may include, but are not limited to points, bonus items, unlocking levels, gameplay currencies, and the like. The user may then play the second game without having to enter the traditional login credentials.

Figure 5:
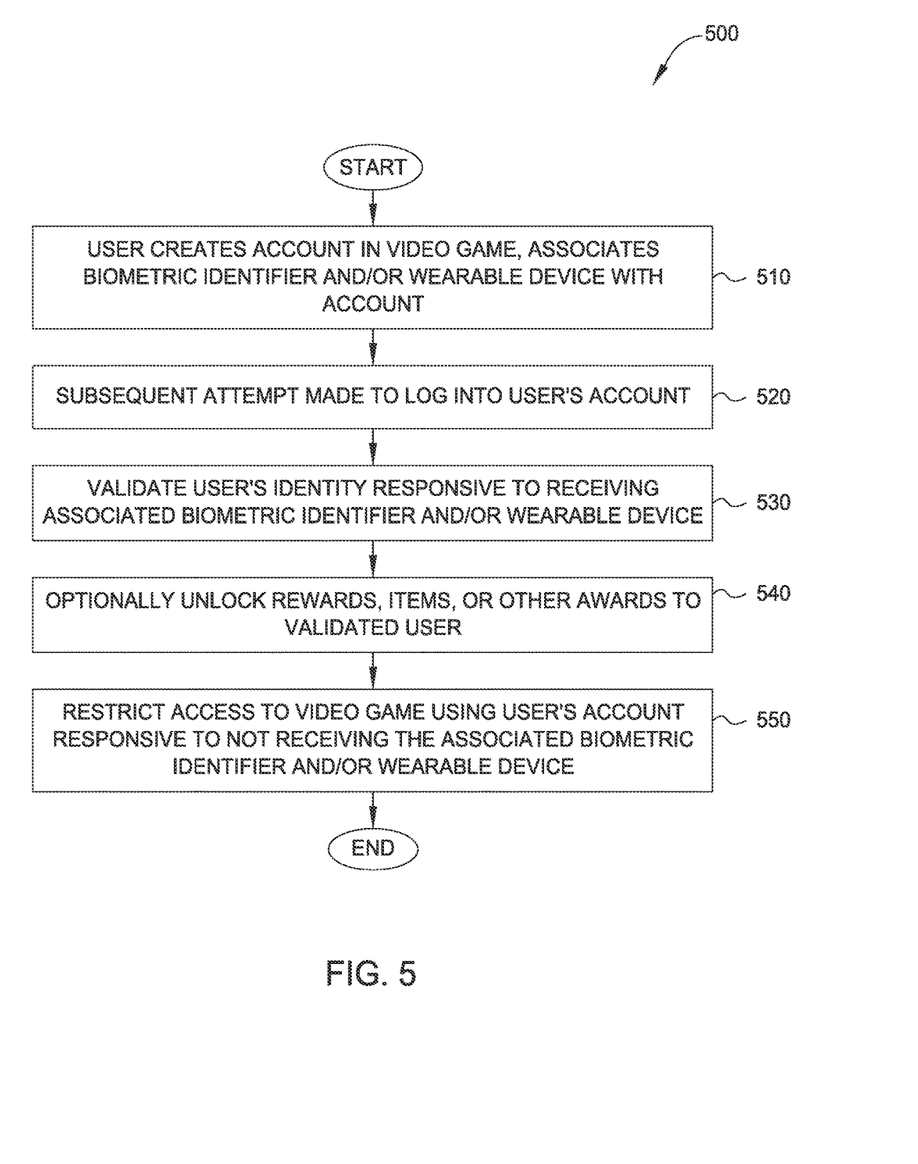
FIG. 5 is a flow chart illustrating a method to validate the identity of a player in a video game, according to one aspect.

FIG. 5 is a flow chart illustrating a method 500 to validate the identity of a player in a video game, according to one aspect. Generally, the authenticator 212 may perform the steps of the method 500 to ensure that video game accounts are accessed only by those people who created the accounts (or are otherwise associated with the accounts). The method 500 begins at step 510, where a user creates an account in a video game and associates a biometric identifier and/or a wearable device with their account. For example, a user JKL may associate a retina scan with his account, which may be stored in the profiles 209. At step 520, the authenticator 212 may receive a subsequent attempt to log into the user's account. For example, the authenticator 212 may determine that someone is attempting to play the video game under JKL's account. At step 530, the authenticator 212 may authenticate the user's identity responsive to receiving the biometric identifier and/or the wearable device. For example, if the person provides a retinal scan that matches the retinal scan data associated with JKL's account in the profiles 209, the authenticator 212 may determine that JKL himself is attempting to log into the game, and not someone else. At step 540, the authenticator 212 (and/or the video game being played) may unlock special items, rewards, or other gameplay objects for the user upon successful validation. For example, JKL may be presented with an unlocked secret level in the video game. Although discussed with reference to a single validated user, more than one user may be associated with an account in a video game. Therefore, if JKL allowed his wife to provide a retinal scan to access his account, when she presents her retinal scan (or other biometric identifier or wearable device), she will be validated at step 530, and may be presented with rewards or other items specific to her at step 540.

If, however, at step 550, the authenticator 212 determines that the biometric identifier and/or the wearable device associated with the account is not received (i.e., a match is not made, or no data is received at all), the authenticator 212 may restrict access to the video game using the requested account. For example, if JKL's wife provides her retinal scan, the authenticator 212 will not return a match to JKL's retinal scan data stored in the profiles 209. As such, JKL's wife will not be permitted to play the video game using her husband JKL's account.

Advantageously, aspects herein authenticate a user based on wearable devices or biometric identifiers. Once authenticated, aspects allow users to seamlessly reinstall applications (including synchronizing state data) on a device or install applications on a new device (which may include synchronized state data). Similarly, a user may be authenticated in a second application using biometric information or wearable devices previously associated with a first application. Further still, aspects disclosed herein validate users associated with an account in a video game based on a biometric identifier and/or a wearable device. Doing so restricts access to specific user accounts in a video game to those users who created the account.

In the foregoing, reference is made to different aspects. However, it should be understood that the disclosure is not limited to specific described aspects. Instead, any combination of the features and elements, whether related to different aspects or not, is contemplated to implement and practice the disclosure. Furthermore, although aspects may achieve advantages over other possible solutions and/or over the prior art, whether or not a particular advantage is achieved by a given aspect is not limiting. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the authenticator 212 could execute on a computing system in the cloud and authenticate users based on biometric identifiers and/or wearable devices. In such a case, the authenticator 212 could authenticate the user and store progress data and identification information at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various aspects. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to aspects of the disclosure, other and further aspects may be devised without departing from the basic scope thereof, and the scope thereof is determined by the claims that follow.

What is claimed is:

1. A method, comprising:
receiving, on a first device, a user request to access a first gaming application using a first user account associated with a first user;
receiving at least one of a biometric identifier of the user and an identifier of a wearable device of the user;
providing access to the first user account upon determining that the received at least one biometric identifier of the user and the identifier of the wearable device of the user match a respective at least one of an associated biometric identifier and an associated wearable device identifier, wherein the at least one associated biometric identifier and associated wearable device identifier are associated with the first user account;
determining that the first gaming application was previously deleted from the first device;
receiving state information of the first gaming application reflecting a previous interaction of the first user with the first gaming application on a second device;
modifying the state information based on a reward provided to the first user;
receiving an installation package for the first gaming application; and
reinstalling the first gaming application on the first device using the installation package and the modified state information.

2. The method of claim 1, wherein the installation package is received by the first device from a first data source, wherein the state information is received by the first device from a second data source, different than the first data source, wherein the reinstalled first gaming application on the first reflects the previous interaction of the first user with the first gaming application on the second device and the reward based on the modified state information, wherein the first user account is authenticated by the biometric identifier of the first user, wherein the biometric identifier comprises at least one of: (i) a fingerprint of the first user, (ii) a scan of a face of the first user, (iii) a deoxyribonucleic acid (DNA) of the first user, (iv) a palm print of the first user, (v) an iris scan of the first user, (vi) a hand geometry of the first user, (vii) a retina scan of the first user, (viii) a scent of the first user, and (ix) a set of palm veins of the first user.

3. The method of claim 2, wherein the first user account is further authenticated by the identifier of the wearable device of the first user, wherein the identifier of the wearable device comprises at least one of: (i) a Bluetooth identifier, (ii) a radio frequency ID (RFID) identifier, and (iii) a near-field communication (NFC) identifier.

4. The method of claim 2, wherein a second user is also associated with the first user account, the method further comprising:
receiving at least one of a second biometric identifier and an identifier of a second wearable device of the second user; and
restricting access to the first user account by the second user upon determining that the received at least one second biometric identifier and the identifier of the second wearable device do not match any of the biometric identifiers and the wearable devices identifiers associated with the first user account.

5. The method of claim 4,
wherein the reward is provided to the first user account.

6. The method of claim 5, wherein the first gaming application is a multi-player video game, wherein the previous interaction comprises: (i) a first interaction between the first user and the first gaming application on the first device, and (ii) a second interaction between the first user and the first gaming application on a third device.

7. The method of claim 6, further comprising:
receiving, on the first device, a request from the first user to access a second gaming application;
receiving the at least one of the biometric identifier of the first user and the identifier of the wearable device of the user responsive to the request to access the second application;
determining that the received at least one biometric identifier of the first user and the identifier of the wearable device of the first user match the respective at least one of the biometric identifier and wearable device identifier associated with the first user account;
determining that the first user account is associated with the first and second gaming applications;
authenticating the first user in the second gaming application on the first device; and
providing a reward to the user in the second gaming application.

8. A computer program product, comprising:
computer-readable code which when executed by a processor performs an operation comprising:

receiving, on a first device, a user request to access a first gaming application using a first user account associated with a first user;

receiving at least one of a biometric identifier of the user and an identifier of a wearable device of the user;

providing access to the first user account upon determining that the received at least one biometric identifier of the user and the identifier of the wearable device of the user match a respective at least one of an associated biometric identifier and an associated wearable device identifier, wherein the at least one associated biometric identifier and associated wearable device identifier are associated with the first user account;

determining that the first gaming application was previously deleted from the first device;

receiving state information of the first gaming application reflecting a previous interaction of the first user with the first gaming application on a second device;

modifying the state information based on a reward provided to the first user;

receiving an installation package for the first gaming application; and reinstalling the first gaming application on the first device using the installation package and the modified state information.

9. The computer program product of claim 8, wherein the installation package is received by the first device from a first data source, wherein the state information is received by the first device from a second data source, different than the first data source, wherein the reinstalled first gaming application on the first reflects the previous interaction of the first user with the first gaming application on the second device and the reward based on the modified state information, wherein the first user account is authenticated by the biometric identifier of the first user, wherein the biometric identifier comprises at least one of: (i) a fingerprint of the first user, (ii) a scan of a face of the first user, (iii) a deoxyribonucleic acid (DNA) of the first user, (iv) a palm print of the first user, (v) an iris scan of the first user, (vi) a hand geometry of the first user, (vii) a retina scan of the first user, (viii) a scent of the first user, and (ix) a set of palm veins of the first user.

10. The computer program product of claim 9, wherein the first user account is further authenticated by the identifier of the wearable device of the first user, wherein the identifier of the wearable device comprises at least one of: (i) a Bluetooth identifier, (ii) a radio frequency ID (RFID) identifier, and (iii) a near-field communication (NFC) identifier.

11. The computer program product of claim 9, wherein a second user is also associated with the first user account, the operation further comprising:

receiving at least one of a second biometric identifier and an identifier of a second wearable device of the second user; and restricting access to the first user account by the second user upon determining that the received at least one second biometric identifier and the identifier of the second wearable device do not match any of the biometric identifiers and the wearable devices identifiers associated with the first user account.

12. The computer program product of claim 11, wherein the reward is provided to the first user account.

13. The computer program product of claim 12, wherein the first gaming application is a multi-player video game, wherein the previous interaction comprises: (i) a first interaction between the first user and the first claming application on the first device, and (ii) a second interaction between the first user and the first gaming application on a third device.

14. The computer program product of claim 13, the operation further comprising:

receiving, on the first device, a request from the first user to access a second gaming application;

receiving the at least one of the biometric identifier of the first user and the identifier of the wearable device of the user responsive to the request to access the second application;

determining that the received at least one biometric identifier of the first user and the identifier of the wearable device of the first user match the respective at least one of the biometric identifier and wearable device identifier associated with the first user account;

determining that the first user account is associated with the first and second gaming applications;

authenticating the first user in the second gaming application on the first device; and providing a reward to the user in the second gaming application.

15. A system, comprising:

a computer processor; and a memory containing a program which when executed by the processor, performs an operation comprising:

receiving, on a first device, a user request to access a first gaming application using a first user account associated with a first user;

receiving at least one of a biometric identifier of the user and an identifier of a wearable device of the user;

providing access to the first user account upon determining that the received at least one biometric identifier of the user and the identifier of the wearable device of the user match a respective at least one of an associated biometric identifier and an associated wearable device identifier, wherein the at least one associated biometric identifier and associated wearable device identifier are associated with the first user account;

determining that the first gaming application was previously deleted from the first device;

receiving state information of the first gaming application reflecting a previous interaction of the first user with the first gaming application on a second device;

modifying the state information based on a reward provided to the first user;

receiving an installation package for the first gaming application; and reinstalling the first gaming application on the first device using the installation package and the modified state information.

16. The system of claim 15, wherein the installation package is received by the first device from a first data source, wherein the state information is received by the first device from a second data source, different than the first data source, wherein the reinstalled first gaming application on the first reflects the previous interaction of the first user with the first gaming application on the second device and the reward based on the modified state information, wherein the first user account is authenticated by the biometric identifier of the first user, wherein the biometric identifier comprises at least one of: (i) a fingerprint of the first user, (ii) a scan of a face of the first user, (iii) a deoxyribonucleic acid (DNA) of the first user, (iv) a palm print of the first user, (v) an iris scan of the first user, (vi) a hand geometry of the first user, (vii) a retina scan of the first user, (viii) a scent of the first user, and (ix) a set of palm veins of the first user.

17. The system of claim 16, wherein the first user account is further authenticated by the identifier of the wearable device of the first user, wherein the identifier of the wearable device comprises at least one of: (i) a Bluetooth identifier, (ii) a radio frequency ID (RFID) identifier, and (iii) a near-field communication (NFC) identifier.

18. The system of claim 16, wherein a second user is also associated with the first user account, the operation further comprising:
  receiving at least one of a second biometric identifier and an identifier of a second wearable device of the second user; and
  restricting access to the first user account by the second user upon determining that the received at least one second biometric identifier and the identifier of the second wearable device do not match any of the biometric identifiers and the wearable devices identifiers associated with the first user account.

19. The system of claim 18, wherein the reward is provided to the first user account.

20. The system of claim 19, wherein the first gaming application is a multi-player video game, wherein the previous interaction comprises: (i) a first interaction between the first user and the first gaming application on the first device, and (ii) a second interaction between the first user and the first gaming application on a third device, the operation further comprising:
  receiving, on the first device, a request from the first user to access a second gaming application;
  receiving the at least one of the biometric identifier of the first user and the identifier of the wearable device of the user responsive to the request to access the second application;
  determining that the received at least one biometric identifier of the first user and the identifier of the wearable device of the first user match the respective at least one of the biometric identifier and wearable device identifier associated with the first user account;
  determining that the first user account is associated with the first and second gaming applications;
  authenticating the first user in the second gaming application on the first device; and
  providing a reward to the user in the second gaming application.

\* \* \* \* \*

UNITED STATES PATENT AND TRADEMARK OFFICE
CERTIFICATE OF CORRECTION

PATENT NO. : 9,700,799 B2
APPLICATION NO. : 14/566147
DATED : July 11, 2017
INVENTOR(S) : Patrick Millegan et al.

It is certified that error appears in the above-identified patent and that said Letters Patent is hereby corrected as shown below:

In the Claims

In Column 14, Line 1, in Claim 13, delete "claming" and insert -- gaming --, therefor.

Signed and Sealed this
Thirty-first Day of October, 2017

Joseph Matal
*Performing the Functions and Duties of the
Under Secretary of Commerce for Intellectual Property and
Director of the United States Patent and Trademark Office*